(12) United States Patent
Ludwig (10) Patent No.: US 9,301,543 B2
(45) Date of Patent: Apr. 5, 2016

(54) SMOKELESS COFFEE ROASTER (71) Applicant: Loring Smart Roast, Inc., Santa Rosa, CA (US)

(72) Inventor: Mark L. Ludwig, Santa Rosa, CA (US)

(73) Assignee: Loring Smart Roast, Inc., Santa Rosa, CA (US)

( * ) Notice: Subject to any disclaimer, the term of this patent is extended or adjusted under 35 U.S.C. 154(b) by 138 days.

(21) Appl. No.: 14/172,829

(22) Filed: Feb. 4, 2014

(65) Prior Publication Data

US 2014/0150673 A1 Jun. 5, 2014

Related U.S. Application Data

(62) Division of application No. 13/529,838, filed on Jun. 21, 2012.

(51) Int. Cl.
| | |
|---|---|
| *A47J 37/07* | (2006.01) |
| *A23N 12/10* | (2006.01) |
| *A47J 42/52* | (2006.01) |
| *A23F 5/04* | (2006.01) |
| *A23F 5/10* | (2006.01) |
| *A23N 12/12* | (2006.01) |

(52) U.S. Cl.
CPC .............. *A23N 12/125* (2013.01); *A23F 5/046* (2013.01); *A23F 5/10* (2013.01); *A23N 12/10* (2013.01); *A47J 42/52* (2013.01); *A23F 5/04* (2013.01); *A47J 37/07* (2013.01)

(58) Field of Classification Search
CPC ..... A23N 12/12; A23N 12/10; A23N 12/125; A47J 42/52; A23F 5/04; A23F 5/046; A23F 5/10

USPC .............. 99/355, 357, 286, 447; 34/544, 576, 34/393
See application file for complete search history.

(56) References Cited

U.S. PATENT DOCUMENTS

| | | | |
|---|---|---|---|
| 2,212,120 A | | 8/1940 | Kneale et al. |
| 3,189,460 A | | 6/1965 | Smith, Jr. |
| 3,848,550 A | | 11/1974 | Bowen |
| 3,855,951 A | | 12/1974 | Giles |
| 4,484,064 A | * | 11/1984 | Murray .......................... 219/400 |
| 5,107,776 A | | 4/1992 | Garcia-Mallol |
| 5,230,281 A | | 7/1993 | Wireman et al. |
| 5,372,833 A | * | 12/1994 | Farina ............................ 426/466 |
| 5,394,623 A | | 3/1995 | Sewell |
| 5,427,746 A | | 6/1995 | Pereira et al. |
| 5,709,542 A | * | 1/1998 | Rentzel et al. ................. 431/242 |

(Continued)

*Primary Examiner* — Erik Kashnikow
*Assistant Examiner* — Preston Smith
(74) *Attorney, Agent, or Firm* — Thomas M. Freiburger (57) ABSTRACT

A coffee bean roasting machine of the type having a cyclone separator heating chamber and a coffee bean roasting chamber in a recirculating process stream driven by a recirculation fan is operated to air cool the roasted coffee beans in the roasting chamber, to a temperature beneath which the beans give off smoke, while at the same time incinerating smoke removed from the roasting chamber. A purge gate in ducting between the cyclone separator and the roasting chamber is opened to allow the flow of ambient air into and through the roasting chamber while blocking flow out of the cyclone separator, so that ambient air is directed through the roasting chamber. The smoke and any airborne particulate material from the roasting chamber are carried into the heating chamber and through the incineration tube, where they are incinerated. Preferably the system and process are operated automatically by a computer and programming.

4 Claims, 6 Drawing Sheets

(56) References Cited

U.S. PATENT DOCUMENTS 5,944,512 A * 8/1999 Ludwig ........................... 432/72
5,958,494 A * 9/1999 Tidland et al. ................ 426/466
6,260,479 B1 * 7/2001 Friedrich et al. ................ 99/468
6,607,768 B1 * 8/2003 Eichner ......................... 426/466
7,143,686 B1 * 12/2006 Sandolo ......................... 99/286

* cited by examiner

SMOKELESS COFFEE ROASTER

This application is a division of application Ser. No. 13/529,838, filed Jun. 21, 2012, now U.S. Pat. No. 8,679,561.

BACKGROUND OF THE INVENTION

This invention primarily concerns coffee bean roasting, although the invention can be applied to other roasting or heating applications as well.

The invention is directed to improvements on the coffee bean roasting apparatus and method described in U.S. Pat. No. 5,944,512, owned by the same assignee as this invention. U.S. Pat. No. 5,944,512 is hereby incorporated by reference in its entirety.

In the apparatus of U.S. Pat. No. 5,944,512, which was applicable to but not specific to coffee beans, coffee beans or other products were roasted in a chamber connected in a recirculating process stream loop with a cyclone separator which included a heating chamber. The patented machine had a gas flame or other heat source emanating from the bottom of the heating chamber and directed concentrically toward an incineration tube directly above. The process stream was introduced tangentially to the cyclone separator, via a circulating fan or blower within the process stream, and spiraled down to the lower region of the heating chamber, around the heating flame, then back upwardly inside a cylindrical shroud and just outside the incineration tube, then directed out of the cyclone separator and ducted back to the bean roasting chamber. By this design very little of the process stream co-mingled with the products of combustion from the heat source, and the process stream was heated to an effective temperature to roast the beans. In the cyclone separator, the chaff from the coffee beans was separated by centrifugal force, and settled down to a particle collection bin or hopper.

In the coffee bean roasters corresponding to U.S. Pat. No. 5,944,512 and sold by the assignee of the present invention, after a roast was completed the beans were released from the roasting chamber into a cooler, for cooling of the beans with ambient air drawn through the beans by a circulating blower. Smoke was released from the roasted beans into the ambient air, until the beans were cooled to a sufficient extent.

Also in the prior coffee bean roaster, a purge feature was included whereby, before the machine's heat source could be activated, safety concerns and regulations required that the entire system volume (atmosphere) be replaced by a volume of fresh air not less than five times the system volume, to prevent the possibility of ignition and explosion. A purge gate was included in a duct in the process stream, just downstream of an outlet of the cyclone separator. Prior to firing up the heating chamber each day, or after any involuntary shutdown, the purge gate would be opened to essentially close or throttle down the outlet from the process stream and to admit ambient air into the duct leading to the coffee bean roasting chamber. Thus, by means of the circulating fan downstream of the roasting chamber, ambient air was drawn into and through the entire system to purge potentially combustible (explosive) gases or particulates that may have accumulated, delivering the air and particulates into the cyclone separator and the heating chamber. These materials would be blown out through the incineration tube via the exhaust stack at its upper end, and the system would be purged and ready to be fired.

Although the patented coffee bean roasting system was mostly smokeless, at the end of the roast there was smoke in the roaster and the beans cooling in ambient air made more smoke. The smoke in the roaster primarily recirculated with the process stream, and the volume of smoke leaving the system through the incineration tube of the cyclone would be cleaned by incineration. The beans in the cooling tray would continue to generate smoke until falling below a certain temperature, and this typically happened about forty-five seconds after the beans were dumped into the cooler at the end of a roast. Other coffee roasters have used a similar arrangement for cooling the beans after the roast, in a cooling tray outside the roaster.

SUMMARY OF THE INVENTION

By the improvement of the current invention, the smoke generated by cooling beans is no longer allowed to enter the ambient air, but instead is incinerated in the incineration tube. In essence, the invention combines the bean cooling step with an air purge. At the end of the roast, rather than dumping the roasted coffee beans into the external cooler right away, the new process leaves the coffee beans remaining in the roaster to undergo a period of cooling. When the roast is completed the purge gate is opened, substantially blocking off the process stream flow out of the cyclone, and the burner is turned up to a higher value. This creates considerably higher heat in the incineration tube; this heat is not recirculated back to the coffee roasting chamber because the purge gate is opened, blocking recirculation. Fresh air is vented in through the purge gate opening and cools the beans down significantly, directly in the roasting chamber, while at the same time flushing out the system from top to bottom and causing the air and all smoke and particulate material to exit via the incineration tube. With the incineration tube already hot from the roasting process, and with the contribution of additional heat from the higher-firing burner, the system achieves virtually complete incineration of the smoke from the beans while the beans remain in the roasting chamber and are being cooled. Finally, when the beans are dropped into the cooler there is almost no smoke generated, because much of the cooling has already taken place in the roaster. The time required for air cooling of the beans in the roaster is adjustable, but can be on the order of about ten seconds to one minute.

It is thus among the objects of the invention to achieve virtually smokeless operation of a coffee bean roaster operating on a cyclone stream principle as in U.S. Pat. No. 5,944,512, by simultaneously purging the roasting chamber of smoke and performing preliminary cooling of the beans with ambient air directly in the roaster, and incinerating the smoke from the beans and the roasting chambers. These and other objects, advantages and features of the invention will be apparent from the following description of a preferred embodiment, considered along with the accompanying drawings.

DESCRIPTION OF PREFERRED EMBODIMENTS

Figure 1:
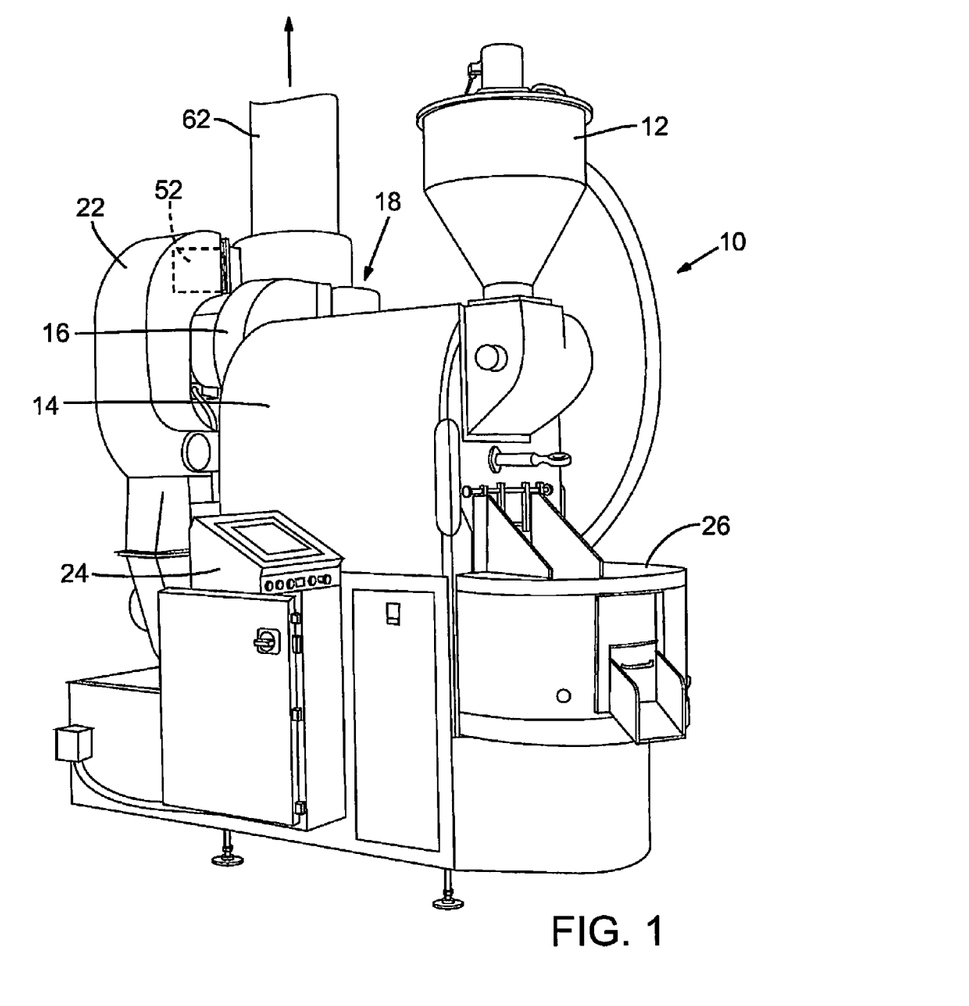
FIG. 1 is a perspective view showing a coffee bean roasting machine of the invention.

FIG. 1 shows a coffee bean roaster 10 according to the invention, generally as described in U.S. Pat. No. 5,944,512. The operation of the machine, for a generically described heating application, is described in the patent and that description is incorporated herein by reference.

The machine 10 has a coffee bean hopper 12, a bean roasting chamber 14, a circulating fan or blower 16 delivering a process stream of gases from the roasting chamber to a cyclone separator 18, only an upper portion of which is seen in FIG. 1, an incineration tube and chamber 20 for exhaust from the cyclone separator, a duct 22 leading from the exit of the cyclone separator 18 back to the roasting chamber 14, controls 24 and a bean cooling tray 26 for receiving roasted coffee beans from the roasting chamber 14. The controls 24 include a computer preferably with a touch screen monitor for user input and system monitoring, the programming in the computer operating the system in accordance with inputs selected by an operator.

Figure 2:
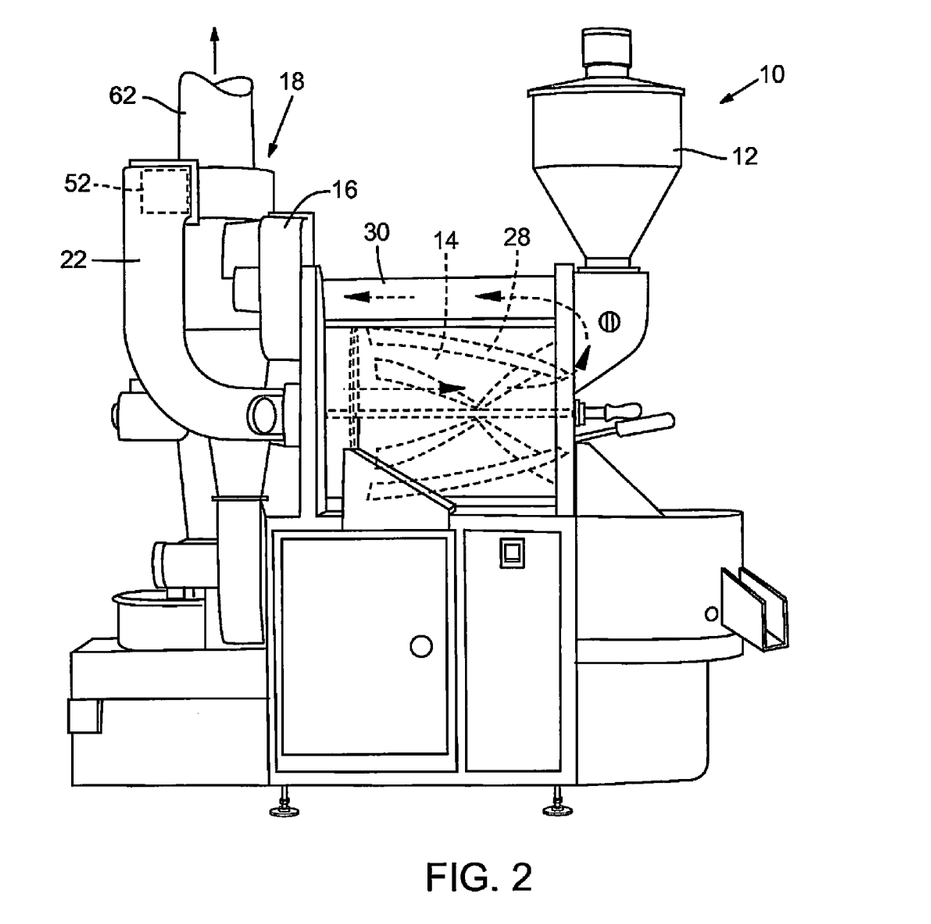
FIG. 2 is a side view of the coffee bean roaster, indicating a process stream flow path.

FIG. 2 shows the machine 10 in side view and indicates a process stream flow path through the roasting chamber 14 (the inside of which is exposed in FIG. 2, revealing bean sifting blades 28), and through a duct 30, through the circulating fan 16 and into the cyclone separator 18. Exiting the cyclone separator, the process stream, as noted above, flows through the duct 22 and back into the bean roasting chamber 14.

Figures 3, 3A:
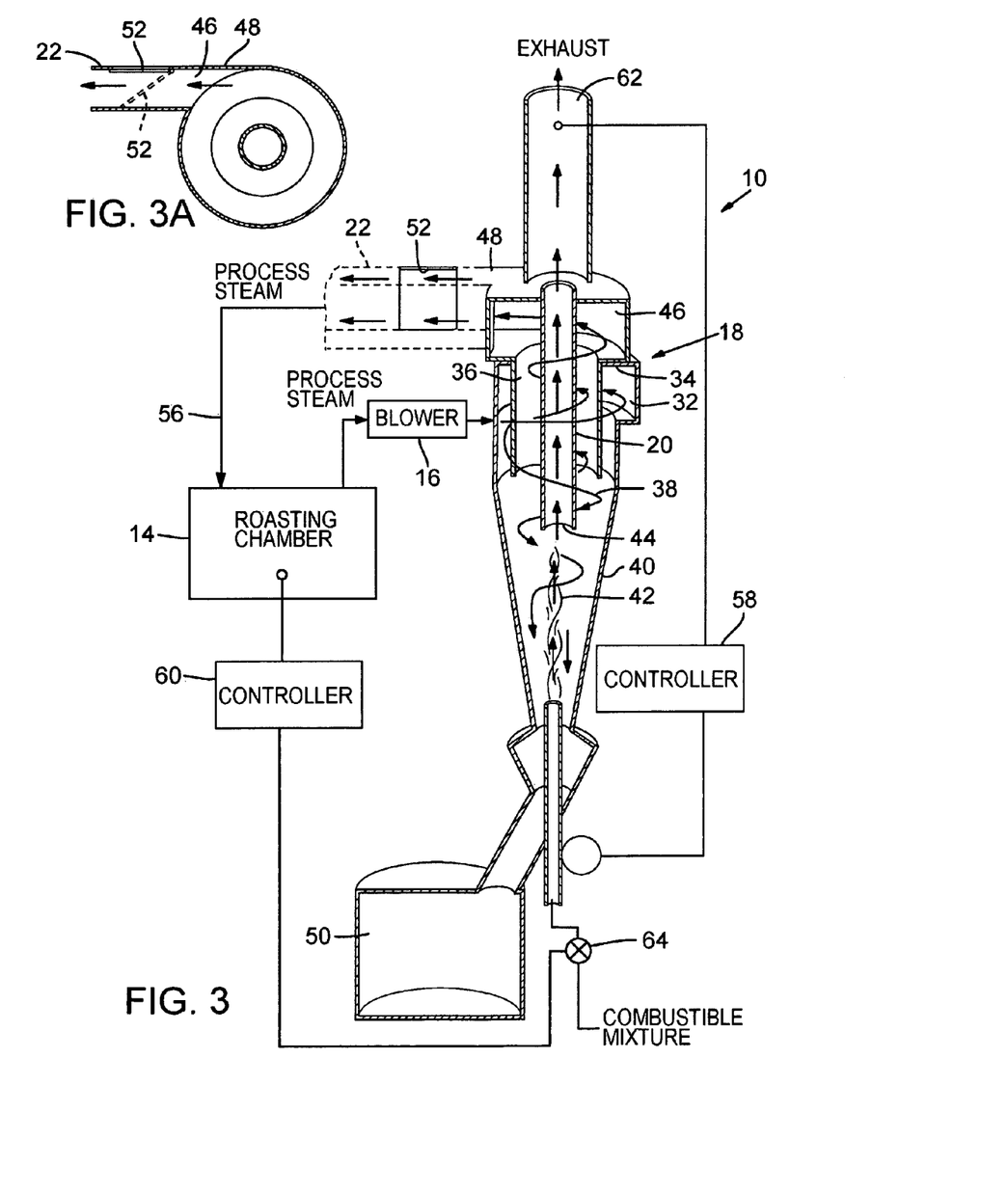
FIG. 3 is a schematic elevation view, partly in perspective and partially in block diagram form, showing process stream flow through the coffee bean roaster.
FIG. 3A is a schematic plan view indicating a feature of the invention.

FIG. 3 shows the flow of the process stream during normal operation, i.e. coffee bean roasting. This operation is fully explained in U.S. Pat. No. 5,944,512 (although not specifically for coffee beans) and will be briefly explained here. The coffee beans in the roasting chamber 14 are roasted by the heated process stream flowing through the chamber. The circulating fan 16 draws the process stream through and out of the roasting chamber and delivers the stream tangentially into a process stream inlet 32 of the cyclone separator 18. This region of the cyclone separator has a ceiling 34, and a cylindrical baffle 36 defines an inner boundary, so that the process stream swirls around in the manner shown by arrows 38 in the drawing, descending down into the conically-shaped lower portion 40 of the separator and flowing around a heat source 42, preferably a gas flame as shown. The process stream is heavier than the hot gases rising with the flame, which enter the lower end 44 of the incineration tube 20, and thus the process stream mingles very little with the combustion gases of the flame 42.

The cyclone separator defines a heating chamber around the heat source 42, much of this heating chamber being defined in the conical section 40.

The process stream is heated by proximity to and partial contact with the heat source 42 and by contact with the wall of the conical section 40, as well as with the exterior of the incineration tube 20. After the stream has swirled down into the heating chamber, which occurs by inertia of downward movement, it rises, in the same swirling pattern, swirling around the incineration tube 20 and within the baffle 36 up to an upper chamber 46 and out of the cyclone separator through a process stream outlet at 48. While in the cyclone separator, the process stream swirls at a considerable rate of speed, separating particles out from the stream by centrifugal force, those particles then dropping down along the walls of the conical section 40 and out of the heating chamber, down into a chaff bin or hopper 50.

Downstream of the process stream outlet 48 of the cyclone separator, the process stream enters the duct 22, passing by a purge gate 52 which is in its normal position aligned with an outer wall of the duct 22, thus simply defining a portion of the duct wall. This is its position during roasting of coffee beans, and is indicated schematically in FIG. 3A.

As indicated by the arrow 56 in FIG. 3, the process stream recirculates back to the roasting chamber, and this continues under the moving force of the circulating fan or blower 16 during the roast. During this time, some of the smoke generated by the roasting beans is incinerated in the incineration tube 20, by repeated passes through the cyclone separator. However, because of limited mingling with the combustion gases from the flame 42, much of the smoke remains in the process stream and in the roasting chamber.

At the completion of a roast, in the operation of the machine as described in the patent, the roasted, hot beans were released into the cooling tray 26 (FIG. 1), where they were cooled, with smoke released to ambient air.

As explained in the patent, controllers are included in the system at 58 and 60, for controlling the height of the flame 42 based on exhaust gas temperature at the exhaust stack 62 of the incineration tube, and for controlling the combustible mixture for the heat source via a valve 64 controlled in accordance with the temperature in the roasting chamber.

Figure 5:
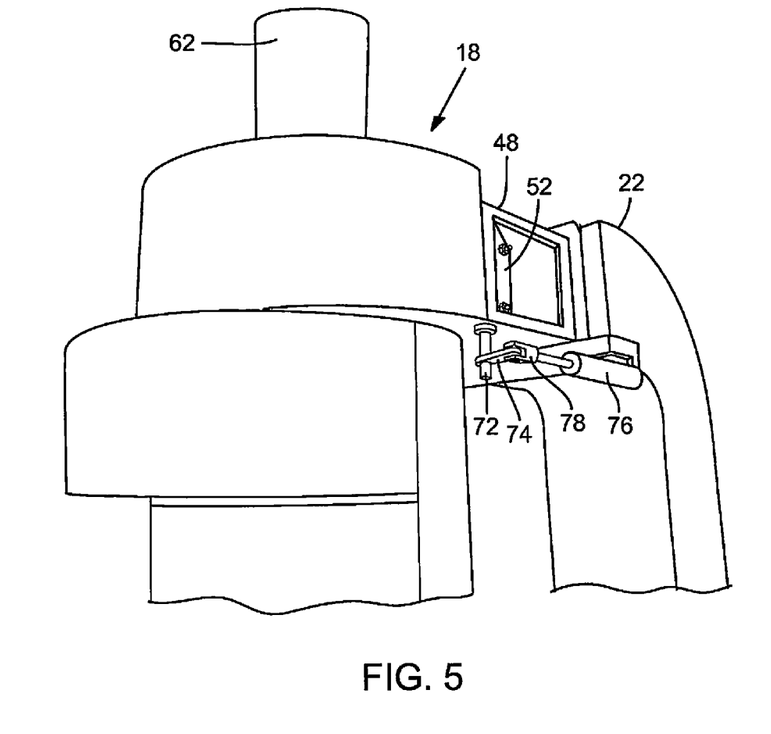
FIG. 5 is a perspective view showing a purge gate and actuator included in the system of the invention.

Although not explained in the patent, the purge gate 52 was included in the coffee roasting apparatus 10. Its purpose was to clear the system of potentially explosive gases and particulate materials before ignition of the heat source 42. This must be done before firing up the roaster in the morning, or at any other time when the heating has been shut down for any reason. For this purpose the purge gate was swung open, as shown in FIG. 5, and at this inwardly-swung position the gate 52 would provide a large vent opening into the duct 22. At the same time the inwardly swung gate 52 would substantially block the flow out of the cyclone separator via the process stream outlet 48. Thus, with the heat source 42 shut down, the purge gate 52 would be swung inward to the purge position and the circulating fan 16 activated, thus cleaning out any potentially explosive gases or airborne particulates, by drawing ambient air through the roasting chamber and into the cyclone separator, but with that stream exiting up through the incineration tube 20 and out the stack 62, since this is the only exit available for the moving air in this mode of operation. In FIG. 3A the purge gate 52 for this mode would be in the position shown in dashed lines.

Figure 4:
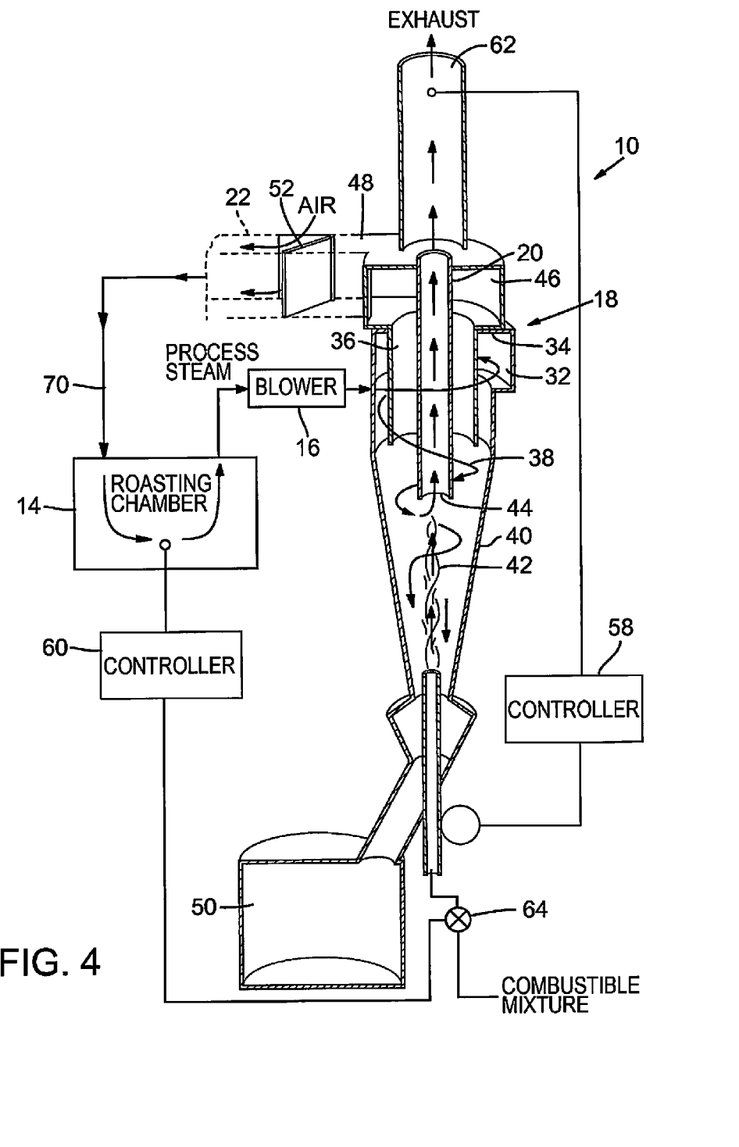
FIG. 4 is a view similar to FIG. 3, but showing the coffee bean roaster system in a different mode.

As explained above, the invention utilizes the purge gate and the purge function in a different way. FIG. 4 illustrates operation in the mode of the invention.

In FIG. 4 a roast has just been completed, and the heat source 42 remains activated. The purge gate 52 is swung inwardly, essentially blocking flow out of the cyclone separator and opening an air vent into the duct 22. As in a pre-firing purge of particulates as discussed above, this causes flow through the roasting chamber and into the cyclone separator, but then up through the incineration tube 20 and out the stack 62. In this case, however, the heating flame 42 is active and preferably is turned higher. The ambient air entering by the purge gate and indicated by arrows 70 in FIG. 4 cools the coffee beans while they remain in the roasting chamber 14. The roasted beans are precooled in approximately ten to sixty seconds by this ambient air. They are cooled below a temperature at which they generate smoke. Importantly, smoke is substantially removed from the beans and from the roasting chamber, and any smoke which has remained in the process stream is also removed. This flow of smoke, gases and air is forced up through the incineration tube 20, which is preferably at higher temperature now to handle the rapidly moving flow of pollutants, and those pollutants are incinerated before being discharged out the stack 62.

In this mode of operation of the bean roasting apparatus, three things are accomplished to a varying degree based on the time duration chosen by the operator: the coffee beans are quickly cooled by the flow of ambient air through the bean roasting chamber, to potentially below smoking temperature; the bean roasting chamber is purged of smoke and particulate material; and the smoke and particles are moved by the circulating blower through the cyclone separator and up through the incineration tube, and incinerated. The machine 10 therefore can be operated to be virtually completely smokeless. The degree of cooling within the chamber is under the control of the operator. The longer the machine runs in air cool mode, the more smoke is reduced, but the beans are not cooling as fast as when they are in the external cooler, so the operator (roastmaster) may want to move the beans out of the chamber as soon as practicable so as not to affect the flavor of the coffee. Some small amount of smoke may still be produced depending on how long internal air cool cycle is allowed to run and how dark the particular roast is. This is at the roastmaster's discretion.

FIG. 5 shows main parts of a mechanism for opening and closing the purge gate 52. The purge gate is attached to a vertically oriented spindle 72 adjacent to the air opening. A crank arm 74 (seen only in edge view) is secured to the spindle 72, so as to rotate the spindle and open or close the gate 52 via a pneumatic cylinder 76 with a linkage 78 to the crank arm. The actuating cylinder 76 is controlled electronically and by software included with the roasting machine. The software includes programming for operating the purge gate 52 as described above, so that the gate is opened for a prescribed and/or operator-selected period of time, while the circulating fan continues to operate, immediately after a roast is completed. The circulating fan speed may be automatically increased as the circulating fan setting is increased. As explained above, the software or logic of the system also purges air through the system just prior to each time the heat source is fired up.

If needed, the incineration tube 20 and incineration chamber/stack can be made longer, or of larger diameter, to provide sufficient dwell time for full incineration of smoke and pollutants. This is not necessary if the flame 42 is turned high enough for the short period of time during which the air cooling/smoke incinerating cycle is operated, which can be a matter of seconds, less than one minute. Note also, the circulating fan 16 is shown in a preferred position just upstream of the inlet to the cyclone separator, but it could be positioned just upstream of the roasting chamber if desired, and similar results would be achieved. Also, the purge gate 52, although conveniently operated in the form shown, could be configured differently. It could be located farther downstream in the duct 22 (although this would prevent purging of the duct 22 in a pre-firing purge of particulates, and thus might be objectionable), or a gate could be provided to close off the process stream outlet 48 of the cyclone separator, and a different gate or door could be opened to vent ambient air into the duct 22 or into the roasting chamber 14.

Note also, the machine and process described herein are not limited to coffee beans, but can be used with cocoa beans or other beans or grains to be roasted, particularly those that generate smoke in roasting.

Figure 6:
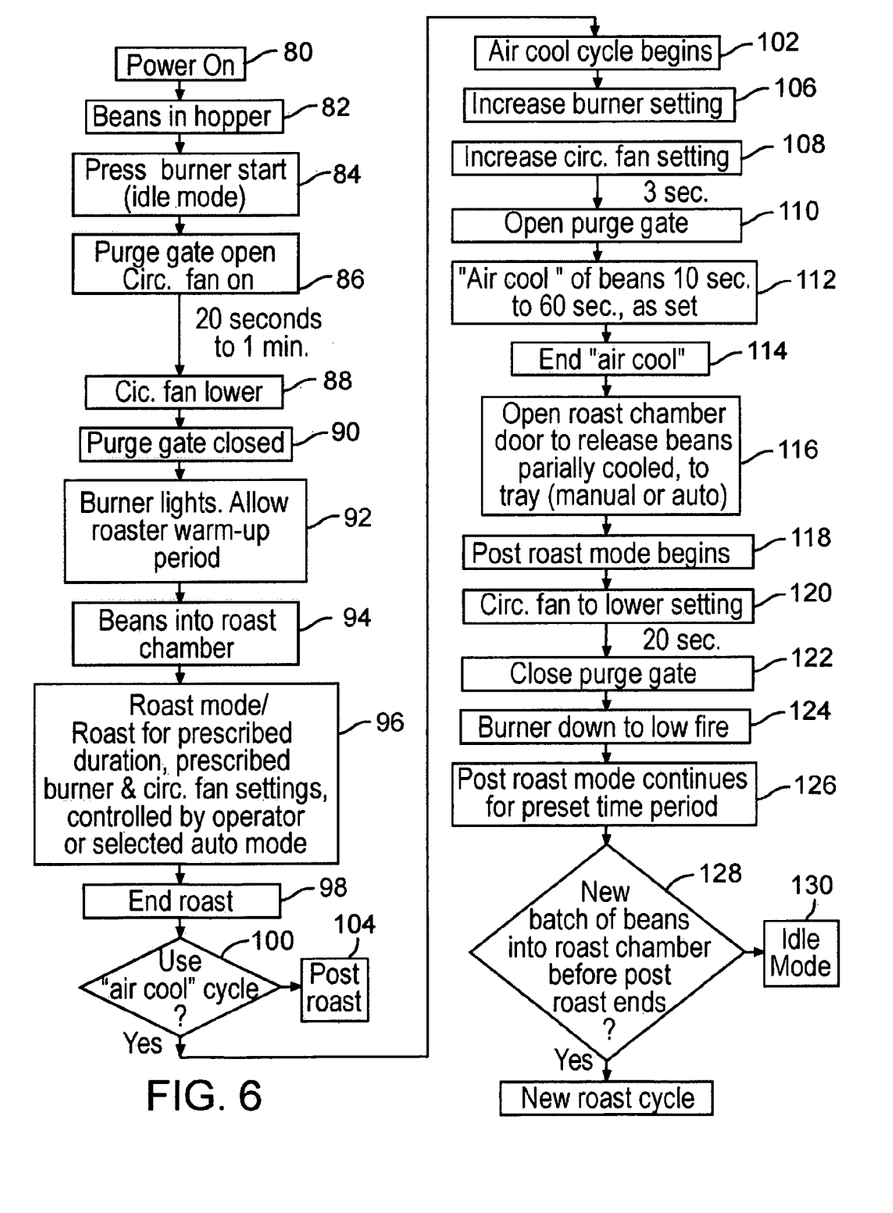
FIG. 6 is a flow chart indicating the process of the invention.

The flow chart of FIG. 6 indicates the process of a coffee roasting cycle according to the invention, in this example illustrating the process from startup, when the machine has been completely off.

The operator turns on the power as indicated in the block 80. The coffee beans are placed in the hopper, or have already been placed, as at 82. The operator presses a "burner start" button and the system enters an idle mode (block 84). The burner is not immediately ignited. The burner is not immediately ignited. The purge gate is opened (or may already be open) and the circulation fan or circulating fan or blower is turned on, as noted in the block 86. The circulation fan needs a period of time to ramp up to speed. Depending on the size of the system, the system purge continues for about twenty seconds to sixty seconds, removing any smoke or airborne particulates that may be in the system prior to igniting the burner. When the purge is completed, the circulation fan speed is automatically lowered (block 88), and the purge gate is closed, indicated at 90.

After completion of the purge and closing of the purge gate, the burner lights, and the roaster is allowed to warm up for an appropriate period of time, as at the block 92. When the roaster chamber is sufficiently warm, the beans are dropped into the roast chamber from the hopper, block 94. The system now enters the roast mode (block 96), in which the burner is heating recirculating air and gases which circulate through the roasting chamber to roast the beans. A drum in the roasting chamber is rotating during the roast, or more preferably, rotating paddles in a stationary drum agitate the beans and assure even roasting. Air agitation can be used, rather than mechanical agitation. The circulation fan setting can be controlled by the operator or by a selected automatic mode. The burner setting can also be selected, manually or automatically.

At the end of the roast, which is indicated in the block 98, a decision is made by the operator or via an automatic mode (block 100) as to whether the "air cool" cycle will be used. If so, the air cool cycle begins, block 102. If not, the system goes into post roast mode as indicated in the block 104. Whether the system enters the "air cool" cycle can be preset prior to operation of the roast cycle.

For the air cool cycle, the burner setting is increased as noted at 106, and the circulation fan setting is also increased, as at 108. There may be a short delay before the circulation fan increase, to give the burner flame time to increase. After the circulation fan flash blower speed is increased, there preferably is imposed a short delay, e.g. three seconds, before the purge gate is opened, as noted in the block 110.

The block 112 indicates that the air cool cycle, cooling the beans in the roaster, proceeds for about ten seconds to sixty seconds. Fresh air is drawn in through the open purge gate and courses through the roaster, cooling the coffee beans and moving the residual smoke out through the incineration tube and stack. The drum (or paddles) in the roaster continues to rotate, turning over the beans. The drum in the roaster continues to rotate, turning over the beans. As the beans are cooling in the roasting chamber, the hot air heated by the burner at this high setting does not recirculate back to the roaster because the purge gate is open, blocking the recirculation path. All gases and airborne particulates exit through the incineration tube and stack. After the time preset for air cool, or as controlled by the operator manually, the air cool cycle ends, as noted in the block 114. This is signaled by the touch screen monitor unit 24, seen in FIG. 1. The drum or paddles cease to rotate.

At the end of the air cool cycle, the roasted and partially cooled beans are released to the exterior cooling tray as noted at 116. This can happen automatically, as preset, or the operator can initiate this manually. The post roast begins, as noted at 118. The circulation fan is reduced to a lower setting (block 120), and after a delay, e.g. twenty seconds as indicated, the purge gate is closed as noted at 122 and the burner flame is reduced to a low fire, as noted at 124.

At this point, post roast mode continues. This mode continues for a preset time, e.g. about three minutes. If a new batch of beans is not moved into the roasting chamber before the post roast period ends, as noted in the decision block 128, the system will transition into idle mode 130. In this mode the burner, which is at low fire, can be preset to cycle between two set temperatures to keep the system from heating up more than desired. Alternatively, the burner can be shut off.

If a new batch of beans is dropped into the chamber (decision block 128), a new roast cycle will begin, as at the block 94. Note that the green coffee beans should not be dropped into the chamber if the burner is off, and the screen will thus instruct the operator.

The software-controlled machine and process have multiple functionalities. With the programmed computer and operator inputs for selected settings, the machine can vary the circulating fan speed as needed or desired; the burner setting can be increased or decreased as needed; the purge gate is opened and closed for different purposes as set forth above; and the opening of the beam discharge door to the cooler can be delayed or modified as desired, depending on internal air cooling time selected. The computer equipment preferably includes a touch screen monitor for operator input as well as display. The computer and input screen are shown in FIG. 1.

Although the machine and process of the invention are described primarily for coffee bean roasting, other roastable beans and grains, particularly those that give off smoke, can be roasted. The claims are to be interpreted as applying to such other beans and grains.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A roasting machine for coffee beans, or other beans or grains, comprising:
    a bean roasting chamber, having a roasting chamber inlet and a roasting chamber outlet for flow of a heated process stream therethrough,
    a cyclone separator comprising a heating chamber with a process stream inlet for admitting a process stream from the bean roasting chamber and a process stream outlet for discharging the process stream, the cyclone separator being configured to induce a cyclone in the process stream for separating particulate matter from the process stream,
    an incineration tube extending into the heating chamber, the incineration tube having an incineration tube inlet opening into the heating chamber and the cyclone separator and an incineration tube exhaust outlet positioned above and outside the heating chamber,
    the process stream outlet of the cyclone separator being connected to the inlet of the bean roasting chamber, and the outlet of the bean roasting chamber being connected to the process stream inlet of the cyclone separator,
    a circulation fan within the process stream, positioned to move the process stream in a recirculating path in normal operation during roasting of beans, so that the process stream flows through the cyclone separator and heating chamber, then through the bean roasting chamber and back into the cyclone separator via the process stream inlet of the cyclone separator,
    a heat source positioned within the heat chamber and cyclone separator, in alignment with and spaced below the incineration tube inlet, the heat source being positioned to produce and direct a column of heated gases into the incineration tube and to heat the interior of the tube to a sufficiently high temperature for incinerating pollutants, the heat source heating the process stream to a lower working temperature suitable for coffee bean roasting when the process stream is passed through the cyclone separator, the process stream being cooler and heavier than said heated gases so that the process stream is flung outwardly within the cyclone separator, the heated gases above the heat source being hotter and lighter than the process stream so that the heated gases are confined centrally within the cyclone separator to prevent any substantial mixing of the process stream with the heated gases, and said pollutants passing through the incineration tube and being incinerated before being exhausted,
    and including automatic air cool cycle bean cooling means for substantially blocking flow of the process stream from the process stream outlet of the cyclone separator while opening an ambient air vent to the bean roasting chamber when a roasting of beans is completed and the roasted beans remain in the roasting chamber, causing ambient air to flow through the bean roasting chamber via the circulating fan,
    whereby beans are partially cooled by the flow of ambient air through the bean roasting chamber, the bean roasting chamber is purged of smoke and airborne particulate material, and the smoke and airborne particulate material are moved by the circulating fan into the cyclone separator and up through the incineration tube and incinerated.

2. The roasting machine of claim 1, wherein the air cool cycle bean cooling means includes high heat means for increasing heat of the heat source to cause substantially complete incineration of smoke and other materials while the roasted beans are cooling in the roasting chamber.

3. The roasting machine of claim 2, wherein the air cool cycle bean cooling means further includes means for increasing speed of the circulation fan while the roasted beans are being cooled in the roasting chamber.

4. The roasting machine of claim 3, wherein the air cool cycle bean means includes a duct between the cyclone separator process stream outlet and the bean roasting chamber, and a swingable purge gate within the duct positioned such that when the purge gate is swung inwardly by the air cool cycle bean cooling means, the gate will substantially block flow of gases out of the cyclone separator while providing said ambient air vent to admit air into the duct downstream of the purge gate.

* * * * *